United States Patent [19]
Porter

[11] 4,106,921
[45] Aug. 15, 1978

[54] APPARATUS FOR LOW PRESSURE AIR FIBERIZATION OF MINERAL FIBER
[75] Inventor: William F. Porter, Medinah, Ill.
[73] Assignee: United States Gypsum Company, Chicago, Ill.
[21] Appl. No.: 722,467
[22] Filed: Sep. 13, 1976
[51] Int. Cl.² ............................................. C03B 37/04
[52] U.S. Cl. ............................................... 65/14; 65/6; 264/8; 264/12; 425/8
[58] Field of Search ................. 65/6, 14; 264/8, 12; 425/8

[56] References Cited
U.S. PATENT DOCUMENTS

| | | | |
|---|---|---|---|
| 2,869,175 | 1/1959 | Ebbinghouse | 65/14 |
| 2,882,552 | 4/1959 | Downey | 65/14 |
| 3,022,538 | 2/1962 | Seterberg | 65/14 X |
| 3,251,666 | 5/1966 | Levecque et al. | 65/14 |
| 3,323,887 | 6/1967 | Downey | 65/14 |
| 3,343,933 | 9/1967 | Mullan et al. | 65/14 X |
| 3,544,254 | 12/1970 | Battigelli | 65/14 X |

Primary Examiner—Robert L. Lindsay, Jr.
Attorney, Agent, or Firm—Samuel Kurlandsky; Robert H. Robinson; Kenneth E. Roberts

[57] ABSTRACT

An apparatus for producing mineral fibers by low pressure air fiberization having a housing defining a substantially toroidal air chamber formed of a forward vertical wall and having a substantially circular central opening, an annular slot provided around the central opening, and an air inlet provided at a portion of the chamber. A cup-form spinner is mounted on a substantially horizontally oriented shaft arranged to be rotated. The spinner is mounted in front of the forward wall of the plenum and with the open end facing the forward wall. A duct is provided to direct molten slag into the spinning cup which ejects molten slag into an air stream emitted from the annular slot of the chamber, thereby producing mineral fiber of excellent quality.

10 Claims, 5 Drawing Figures

APPARATUS FOR LOW PRESSURE AIR FIBERIZATION OF MINERAL FIBER

BACKGROUND OF THE INVENTION

1. Field of Invention

The present invention relates to an apparatus for producing mineral fibers, and more particularly refers to such an apparatus in which compressed air is utilized to form the fibers instead of conventionally used steam.

2. Description of the Prior Art

It has been conventional in the prior art to produce glass and mineral wool fibers by conveying a stream of molten material such as glass or slag onto a rotating surface. The molten material is thereby centrifuged into the path of a high velocity stream formed of superheated steam, the centrifuged material originally in the form of finely divided molten streams is blasted by the steam and formed into solidified material of fibrous form. Among the patents which disclose this method are U.S. Pats. No. 2,869,175, 2,944,284, 3,013,299 and 3,022,538. However, the processes disclosed using steam were not completely satisfactory, since, the relatively high velocity and impact force of steam caused an undesirable attenuation and severance or breakage of the mineral fibers, thereby reducing the efficiency of the apparatus and the quality of the finished product. Moreover, the use of steam required rotor speeds of the centrifugal apparatus to be kept within critical limits in order to obtain filaments of a desired diameter. For example, where speed of the rotating disc was too high, the secondary attenuation produced thereby resulted in loose fibers which were too thin and frangible for normal use. Further, the fibers produced were of extremely short length and did not assume the structure of elongated threads or fibers. In order to overcome the deficiencies of steam operated fiberizing equipment, a method and apparatus were disclosed in U.S. Pat. No. 2,882,552 for using compressed air of low pressure to avoid the undesirable effects resulting from the use of high pressure steam. In the use of compressed air an advantage was realized in that no secondary attenuating defects were realized and the tendency to break or sever the filaments into short lengths was eliminated. However, the method and apparatus disclosed in that patent were not as efficient as desired and the quality of the mineral wool produced still left something to be desired with respect to the quality and the surface uniformity and smoothness of the finished fibers. Moreover, the apparatus disclosed in the patent is awkward to load and difficult to operate. The apparatus takes a lot of attention, is erratic, produces low yield and a high ratio of shot to fibers.

SUMMARY OF THE INVENTION

It is accordingly an object of the present invention to provide an apparatus for the fiberization of mineral fibers which is more efficient than that of existing methods and apparatus.

It is further an object of the invention to provide a method and apparatus for producing mineral fibers wherein the fibers are of more uniform and longer length and have better surface properties.

It is still further an object to provide a method and apparatus for the fiberization of mineral fibers which is relatively inexpensive and simple to fabricate, and which will operate over extended periods of time without the need for repair or rebuilding.

Other objects and advantages of the invention will become apparent upon reference to the drawings and details of the description.

According to the invention, an apparatus for the fiberization of mineral fibers is provided having an air plenum or housing having a central circular opening and defining a generally toroidal chamber. An annular slot is provided adjacent the circular opening, and an air inlet is provided at a remote portion of the plenum. A rotating cup is provided at the annular slot and means is provided for transporting molten slag to the rotating cup. In an improved form a plurality of radial baffles are placed in the plenum around the central opening to provide uniform air flow to the annular slot. Additionally, as a further improvement, adjusting baffles are placed in the plenum to adjust the air flow for uniformity.

DESCRIPTION OF THE PREFERRED EMBODIMENT

Figure 1:
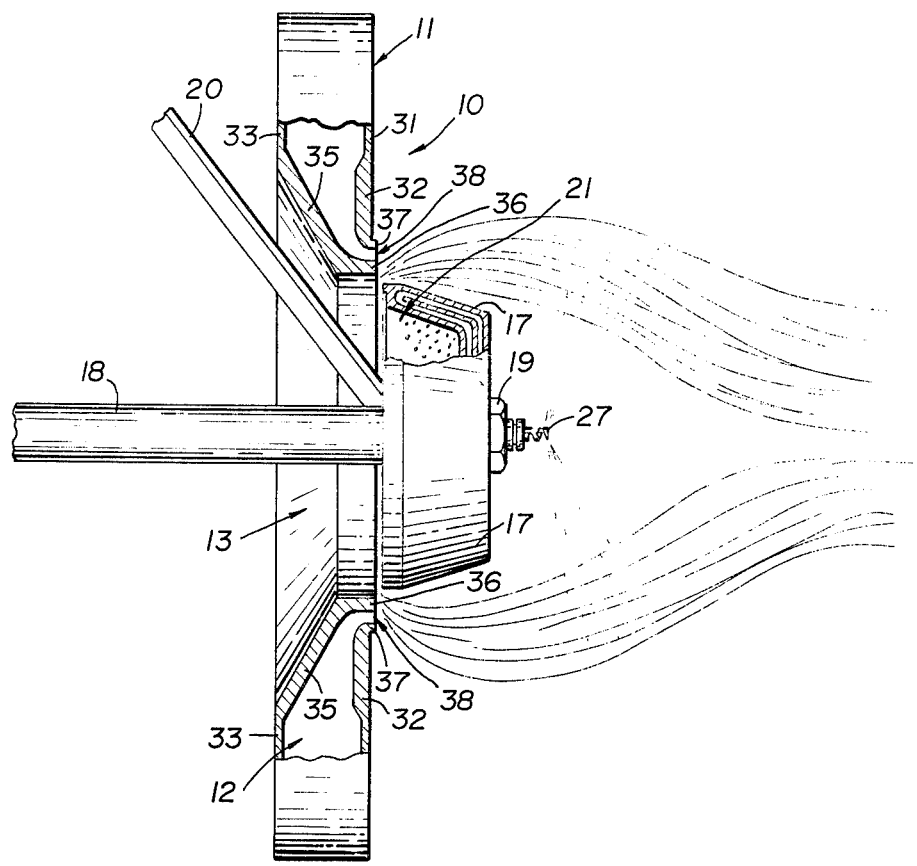
FIG. 1 is a side elevational veiw partly in cross-section of the apparatus of the invention.
Figure 2:
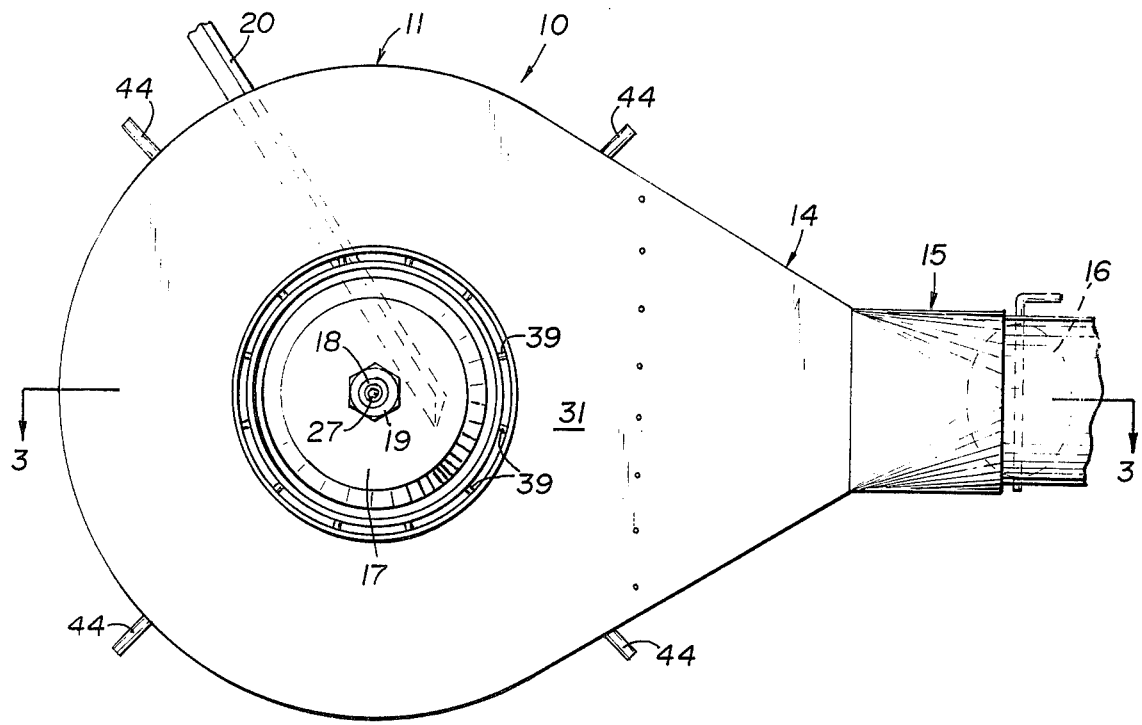
FIG. 2 is a front elevational view of the apparatus shown in FIG. 1.
Figure 3:
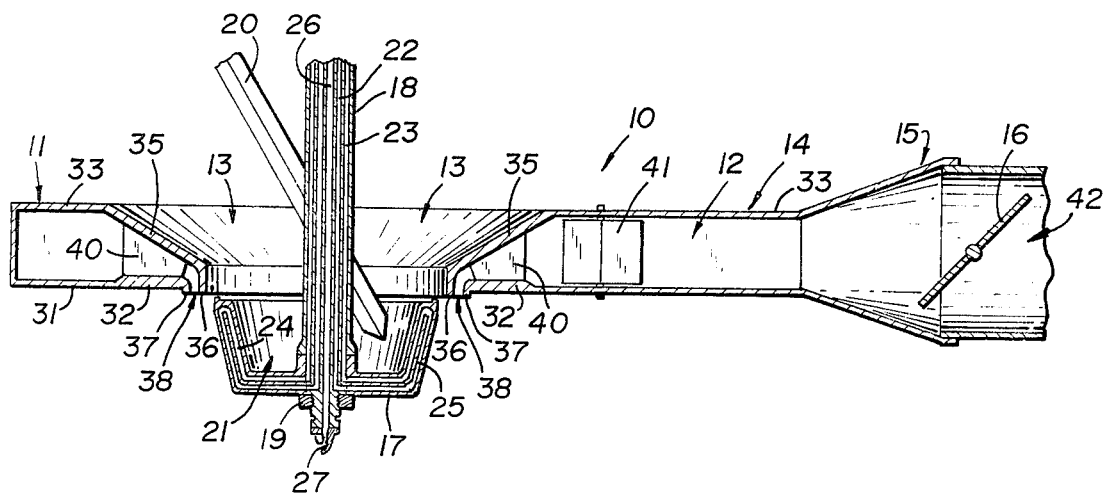
FIG. 3 is a cross-sectional view taken at the line 3—3 of FIG. 2, looking in the direction of the arrows.

Referring to FIGS. 1–3, the fiberization apparatus 10 is shown comprising an air plenum or housing 11 defining a substantially toroidal chamber 12 and having a circular central opening 13. The plenum 11 is provided with an elongated portion 14 terminating in an air inlet 15 having an adjustable damper 16 for controlling the rate of air flow.

A rotating cup 17 is mounted on a shaft 18 which is mounted for rotation and powered by a power source such as an electric motor. A nut 19 retains the cup 17 on the shaft 18. A trough 20 is provided for introducing molten slag into the cavity 21 of the cup 17. If desired the trough may be hollow and provided with water cooling.

As shown particularly in FIGS. 1 and 3, the shaft 18 is provided with water inlet and outlet tubes 22 and 23, which are in turn connected to water inlet and outlet tubes 24 and 25 provided in the cup 17. A central tube 26 is provided for conducting a material such as an adhesive or lubricant to be applied to the formed fibers and exits through a nozzle 27.

Figure 4:
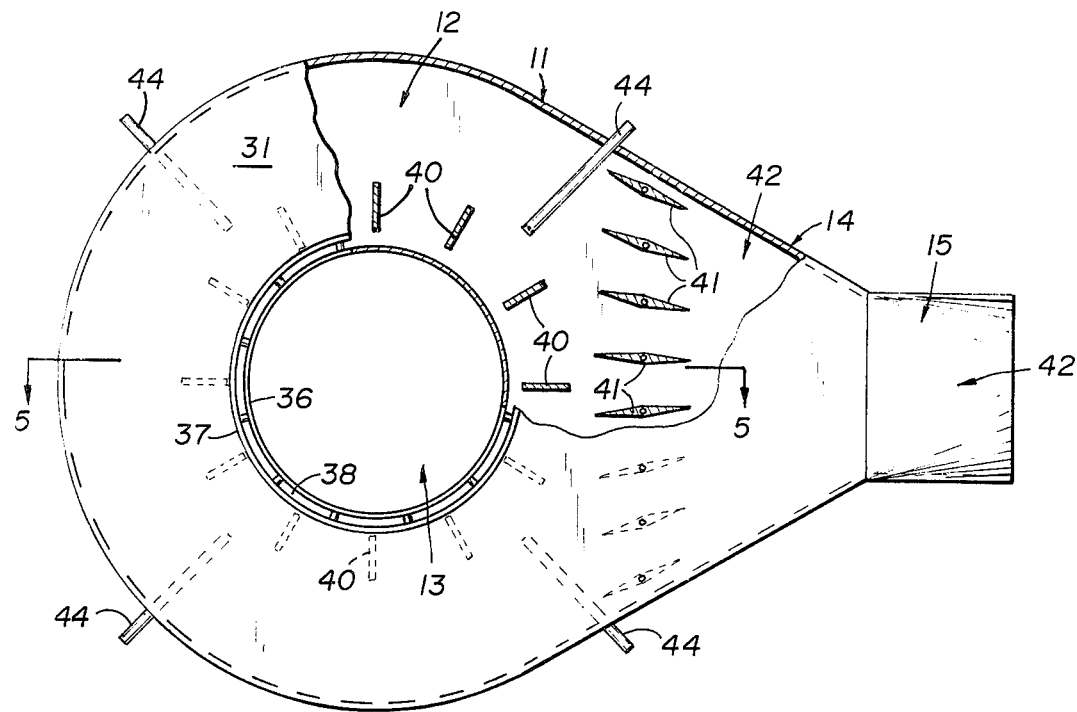
FIG. 4 is a front elevational view, partly broken away, of the air plenum of the invention.
Figure 5:
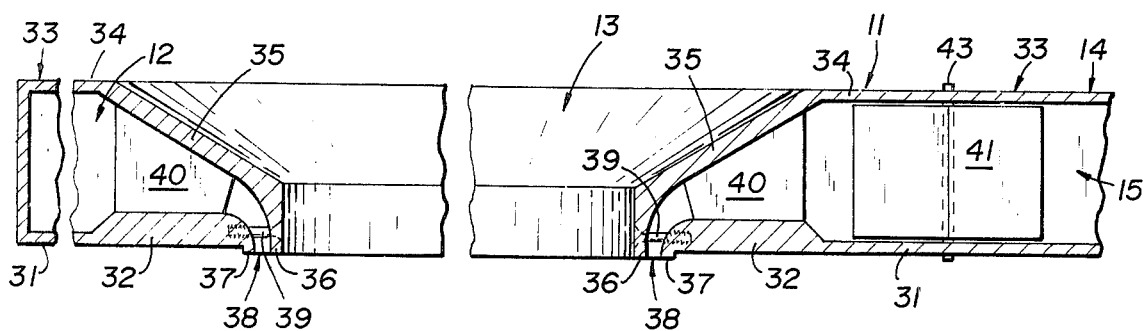
FIG. 5 is a cross-sectional view taken at the line 5—5 of FIG. 4, looking in the direction of the arrows.

Referring to FIGS. 4 and 5, the air housing or plenum 11 of the invention is shown in detail and comprises an annular front wall 31 having an inner enlarged portion 32 which may comprise an annular plate welded to the front wall 31. The plenum 11 further comprises a rear wall 33 comprising an annular rear wall member 34 and a frustoconical member 35 affixed to the rear wall member 34 and terminating in a lip portion 36. The enlarged portion 32 of the front wall 33 is also provided with a lip member 37 which cooperates with the lip member 36 of the rear wall to define an annular slot 38 adapted to discharge compressed air from the plenum chamber. Staybolts 39 maintain the lips 36 and 37 in spaced-apart position. A spacing of up to 1 inch may be used, although excellent results are obtained with spacing of ¼ inch.

In order to provide uniform air flow from all portions of the annular slot 38, fixed radial vanes 40 are mounted within the torodial chamber 12 by any suitable means such as welding. Additionally, adjustable vanes 41 are provided in the extended air inlet portion 14 of the plenum 11 for further insuring uniform distribution of air. The vanes 41 are mounted on a vertical shaft 43 which may be rotated by any suitable means such as a wrench or handle. Pressure sensing probes 44 are mounted at several positions within the plenum chamber to monitor the air pressure at various points to facilitate adjustment of the adjustable vanes 41. They are hollow tubes sealed at the distal end and provided with holes along the side.

In operation, the shaft 18 is rotated, causing the cup 17 to rotate. Water is forced into the ducts of the shaft and around the ducts of the cup 17 and then discharged through the shaft 18 again to keep the cup 17 cool. Additionally, a treating material such as an adhesive is forced through the duct 26 of shaft 18 and through the nozzle 27, causing the material to be sprayed over the formed mineral fibers. Molten slag is introduced into the groove of the feeding trough 20, and is discharged into the chamber of the cup 17. Th centrifugal force developed by the cup 17 causes the molten slag to be ejected in small streams radially outwardly. Air pressure is applied to the compressed air inlet 15, causing air from within the plenum to be forced out of the annular slot 38. The expelled air catches the small streams of molten slag and transforms them into mineral fibers of excellent diameter and length and having smooth surface properties and great strength. Additionally, the adhesive expelled from the nozzle 27 becomes coated on the surface of the fibers.

In carrying out the process utilizing the present invention, air pressure of 3–3 psig (pounds per square inch gauge) should be used. A preferred range is from 6–7 psig. The air volume rate should be from about 2000–10000 cubic feet per minute with a preferred air volume rate of about 8000 cubic feet per minute. The use of a large mass of air at large volume and low pressure to transform the molten mineral slag into fiber, as opposed to larger air pressure at low volume, results in the production of fibers of excellent length and having very smooth surface characteristics. Additionally, increased production rate and large savings are achieved. A further advantage is that operating cost savings for each apparatus range from $8.00 per hour to $20.00 per hour (depending on fuel and power costs). The fibers produced with air blowing are finer, smoother and stronger than those produced with steam. Mineral fiber batts produced with the present invention are more resilient and exhibit better handling characteristics than steam blown batts. The fibers produced by the present invention, when viewed with a scanning electron microscope, appear smooth and provide excellent resin to fiber bonds, thereby providing improved resilience and handleability. For best results rotating cup speeds in the range of from about 2000 rpm to about 3000 rpm should be utilized.

It is to be understood that the invention is not to be limited to the exact details of operation or materials shown or described, as obvious modifications and equivalents will be apparent to one skilled in the art.

Invention is claimed as follows:

1. In an apparatus for producing mineral fibers by forming molten slag and transforming the slag into fibers, the improvement comprising in combination:
  (a) An air plenum defining a substantially toroidal air chamber and having a circular central opening, wherein said plenum is formed of a front wall, a rear wall, and a peripheral wall connecting said front wall and rear wall in spaced-apart relationship, and wherein said rear wall has a frustoconical portion surrounding said central opening converging toward said forward wall and defining a funnel for directing air toward said central opening, the radial dimension of said air chamber being greater than the axial dimension thereof, an annular opening provided in said plenum surrounding said circular opening and permitting air to be discharged from said torodial chamber through said opening in an axial direction with respect to said toroidal chamber, and a compressed air inlet,
  (b) A cup mounted on a shaft adapted for rotation, the lip of said cup being positioned at said annular opening, and
  (c) means for introducing molten slag into the interior of said cup when said cup rotates,
the arrangement being such that centrifugal force produced by rotation of said cup expels streams of molten slag into the air stream being discharged from said annular slot, and the air stream transforms said slag streams into mineral fibers.

2. An apparatus according to claim 1, wherein a portion of said plenum is elongated at said air inlet.

3. An apparatus according to claim 1, wherein a valve is provided in said plenum at said air inlet to control incoming air.

4. An apparatus according to claim 1, wherein fixed radial vanes are provided in said plenum surrounding said slot for controlling uniformity of air flow from said annular slot.

5. An apparatus according to claim 2, wherein adjustable vanes are provided in the elongated portion of said plenum for equalizing air flow.

6. An apparatus according to claim 1, wherein said annular slot is defined by spaced-apart lips directed forwardly, and the lip of said cup is directed rearwardly in oppositely to the lips of said plenum.

7. An apparatus according to claim 6, wherein the lips defining said annular slot are spaced at least about ¼ inch apart.

8. An apparatus according to claim 1, wherein water ducts are provided in both said shaft and said cup for providing cooling thereof.

9. An apparatus according to claim 1, wherein a duct is provided in said shaft and a nozzle is provided at the end of said duct for spraying treating materials on said mineral fibers.

10. An apparatus according to claim 1, wherein said front wall and said rear wall each have an annular lip surrounding said central opening directed forwardly, said lips being spaced-apart and cooperating to define said annular opening in the form of an annular slot.

* * * * *